Jan. 3, 1961 P. BURSTOW ET AL 2,967,212
IDENTIFYING TESTING OR DISCRIMINATING DEVICE
Filed Aug. 12, 1958 2 Sheets-Sheet 1
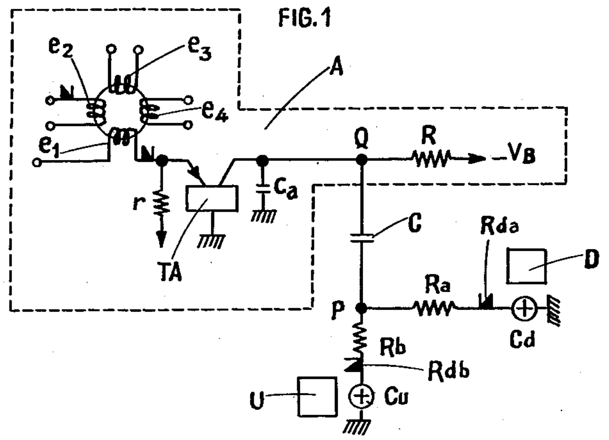
FIG. 2
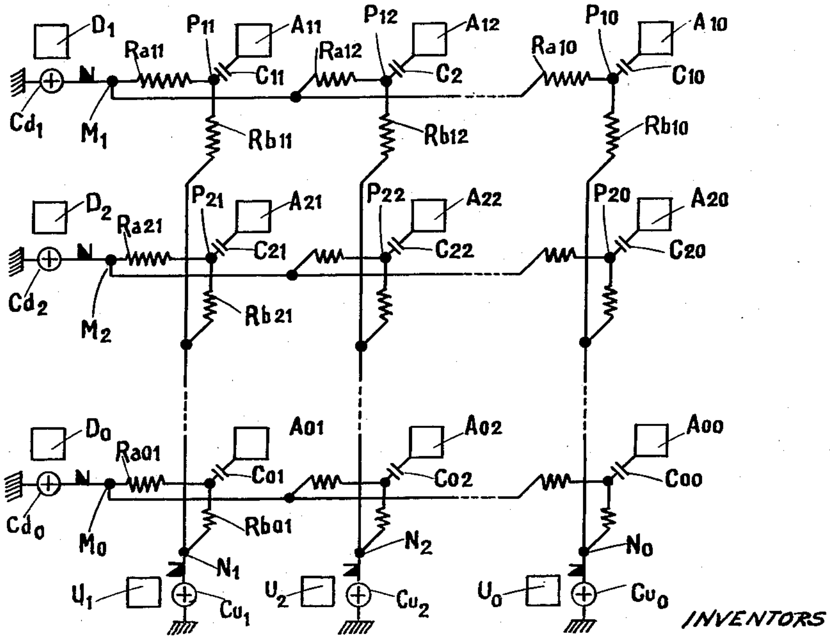
INVENTORS
PIERRE BURSTOW
CLAUDE MONIN
BY [signature]
ATTORNEY

IDENTIFYING TESTING OR DISCRIMINATING DEVICE

Filed Aug. 12, 1958 2 Sheets-Sheet 2

INVENTORS
PIERRE BURSTOW
CLAUDE MONIN
BY P. M. Craig, Jr.
ATTORNEY

United States Patent Office 2,967,212

Patented Jan. 3, 1961

2,967,212

IDENTIFYING TESTING OR DISCRIMINATING DEVICE

Pierre Burstow, Paris, and Claude Monin, Villennes-sur-Seine, France, assignors to Compagnie Industrielle des Telephones, Paris, France, a corporation of France Filed Aug. 12, 1958, Ser. No. 754,608

Claims priority, application France Aug. 28, 1957

5 Claims. (Cl. 179—18)

Figure 3:
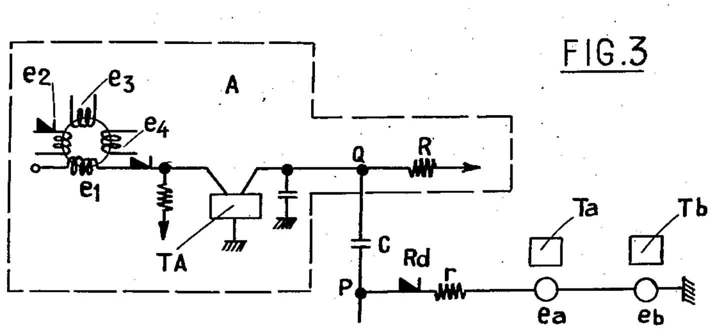

The present invention relates to an identifying, testing or discriminating device which may be employed in the telecommunications art, notably in an automatic electronic switch, either for identifying subscribers or for determining the state of engagement or availability of a line, or again for distinguishing the categories to which the calling and called subscribers may belong.

In the case of identification, the invention has for its object to identify systematically the calling subscriber, that is to say, to determine his number, so as to enable his ringing relay to be re-operated in certain cases. This is the case for example, if the dialled digit corresponds to a call for a direct connection to a line of the public network.

In the case of testing, the invention permits, when the register has received the number of the called subscriber and depending upon whether the ringing relay of the called subscriber has responded or has remained in its previous state of operation, of determining whether the called subscriber's line is free or busy.

Finally, in the case of discrimination between categories of subscribers, the device permits of ascertaining certain particulars, for example if the called subscriber has a plurality of grouped lines, if he can receive communications from the public network, if the calling subscriber has the right to a direct connection to the public network, if his station has priority, etc. These various particulars are supplied by the ringing relay of the subscriber in question, either at the time when it becomes operative or at the time when it releases. The very different applications of the invention, which include notably those hereinbefore mentioned, all arise from the same device, which consists in utilising the potential change of a given point of the ringing relay in question, at the time when this change takes place, that is to say, at the time when the ringing relay assumes the unoperated or operated state. However, depending upon circumstances, some constructional details of the device permit slight modifications.

According to the invention, the potential of the collector of a magnetostatic relay (defined in French Patent No. 1,160,506 and its certificates of addition, this French patent corresponding to the United States application Serial No. 693,180, filed October 29, 1957, and the certificate of addition corresponding to United States application Serial No. 777,373, filed December 1, 1958) is considered, to which there is connected one electrode of a condenser, the other electrode of which is at a common point between a number of branches, each branch comprising in series a variable resistance, a rectifier and at least one control winding of a magnetostatic relay, the free end of which is connected to earth, the rectifier being so directed that the discharge of the condenser can take place, but the rectifier being directed in each branch in such manner as to utilise the current pulse either at the pulling-up of the ringing relay or at its release.

Thus, if the device is applied to identification, the release of the calling subscriber's ringing relay causes the sending of a pulse, which is branched into two circuits: in one of the circuits a tens relay is actuated, while in the other a units relay is actuated, the two relays reproducing the number of the calling subscriber's ringing relay which has just released.

If the device is applied to the testing of the called subscriber, a pulse is sent at the instant of the operation of the called subscriber's ringing relay to a branch comprising in series the control windings of the testing relays corresponding to the various registers.

If the device is applied to the discrimination of the categories of subscribers, the pulse is sent into a branch comprising the series-connected windings of the relays allocated to the same discrimination in the various registers.

Figure 4:
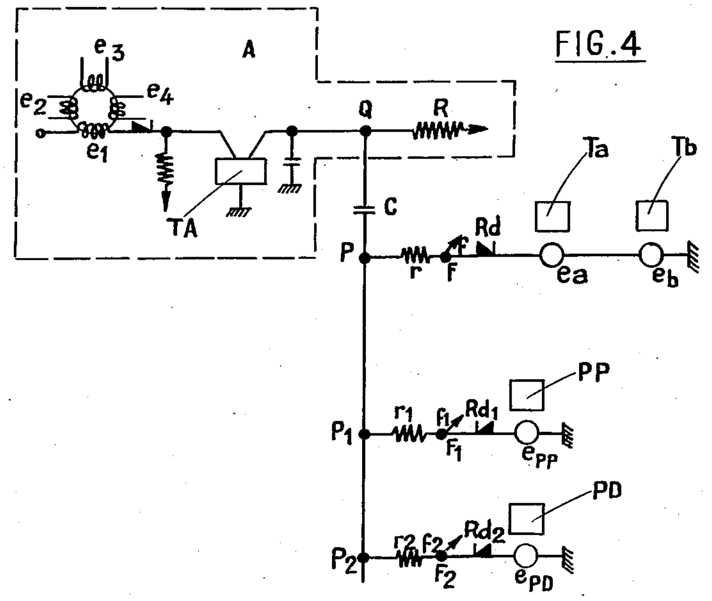

Further features and advantages of the invention will become apparent from the description given in the following with reference to the figures of the accompanying drawings, which show by way of example various applications of the device:

Figure 1 is a diagram illustrating the application of the device according to the invention to the identification of a calling subscriber, Figure 2 illustrates a matrix element according to the invention, applied to identification in the case of an automatic switch serving 100 subscribers, Figure 3 is a diagram illustrating the application of the device according to the invention to the testing of a called line, and Figure 4 is a diagram illustrating a device for discrimination and a device for testing according to the invention.

The part A of Figure 1 which is enclosed in the chain-dotted line represents a magnetostatic relay of the type described by applicants in French Patent No. 1,160,506, filed on November 9, 1956, for "Magnetostatic Relay."

The said relay A comprises, among other elements, a saturable magnetic circuit, on which are wound a working winding $e_1$ connected in series with a rectifier, control windings $e_2$, $e_3$, $e_4$, of which one, the winding $e_2$, is connected in series with a rectifier. The relay A also comprises a transistor T1, the emitter of which is connected on the one hand to the working winding $e_1$ through a rectifier and on the other hand to a polarity through a resistance *r*, the base being earthed and the collector being earthed through a condenser C*a*. Also connected to the collector of the transistor TA is a ballast resistance R, the other end of which is at the negative potential from a source $V_B$. At the point Q on the collector of the transistor TA, in shunt with the ballast resistance R, there is established a connection QP through a condenser C. At the point P, two circuits are connected in parallel: a first circuit comprising a resistance R*a* in series with a rectifier R*da* and with a control winding C*d* of a tens relay D, and a second circuit comprising a resistance R*b* in series with a rectifier R*db* and with a control winding C*u* of a units relay U. The relays D and U are of the magnetostatic storage type of similar construction to the relay A and are situated in the register.

When the connection between the subscriber's equipment and the register is effectively established, the calling subscriber's ringing relay releases, a current in the winding $e_4$ having given ampere-turns of opposite direction.

By reason of its return to the inoperative state, the potential of the point Q taken from the collector of the transistor TA changes from the positive value to a negative value and consequently the voltage across the terminals of the condenser C varies, giving rise to a current pulse. A current flows through the windings C*d* and C*u* in the forward direction of the rectifiers R*da* and R*db*, the said current being such that the ampere-turns produced are positive and produce the operation of the storage relays U and D situated in the register.

As a result of the operation of the relays U and D, the calling subscriber's ringing relay changes back to the operated position, and a marking current, supplied by the marking device associated with the register, for example by the marking matrix which formed the subject of the French patent application filed by applicants on August 5, 1957, for "Electronic Marking Device," corresponding to United States application Serial No. 749,522, filed July 18, 1958, energises the winding $e_2$ of the ringing relay, provided that the calling subscriber has dialled the conventional digit giving access to an external line.

Figure 2 shows by way of example an identifying matrix in the case of one hundred subscribers. In the horizontal direction, $A_{11}$, $A_{12}$, . . ., $A_{10}$ are the ringing relays corresponding to the tens digit 1, $A_{21}$, $A_{22}$, . . ., $A_{20}$ are the ringing relays corresponding to the tens digit 2, and $A_{01}$, $A_{02}$, . . ., $A_{00}$ are the ringing relays corresponding to the tens digit 0. In the vertical direction, $A_{11}$, $A_{21}$, . . ., $A_{01}$ are the ringing relays corresponding to the units digit 1, $A_{12}$, $A_{22}$, . . ., $A_{02}$ are the ringing relays corresponding to the units digit 2, and $A_{10}$, $A_{20}$, . . ., $A_{00}$ are the ringing relays corresponding to the units digit 0.

As shown in Figure 1, there is connected to point Q of each ringing relay in Figure 2, for example $A_{21}$, which is of identical construction to the relay A of Figure 1, a condenser $C_{21}$, the other electrode of which constitutes a common point $P_{21}$ between a horizontal resistance R*a*21 and a vertical resistance R*b*21 associated with the same ringing relay $A_{21}$.

In the matrix illustrated in Figure 2, a tens identification relay $D_2$, for example, is common to the ringing relays for the tens digit 2 situated on the same horizontal, $A_{21}$, $A_{22}$, . . ., $A_{20}$, to the condensers $C_{21}$, $C_{22}$, . . ., $C_{20}$, and to the horizontal resistances R*a*21, R*a*22, . . ., R*a*20, the multiplying point $M_2$ being situated between the rectifier R*da* and a horizontal resistance R*a*. Similarly, a units identification relay $U_1$, for example, is common to the ringing relays for the units digit 1 situated on the same vertical, $A_{11}$, $A_{21}$, . . ., $A_{01}$, to the condensers $C_{11}$, $C_{21}$, . . ., $C_{01}$, and to the vertical resistances R*b*11, R*b*21, . . ., R*b*01, the multiplying point $N_1$ being situated between the rectifier R*db* and a vertical resistance R*b*.

It will be assumed that the ringing relay $A_{21}$ releases when the connection between the calling subscriber's equipment 21 and the register has been established. It has been seen that a discharge current of the condenser $C_{21}$ is set up and the current pulse is branched at the point $P_{21}$ into two circuits: in the first circuit through the resistance R*a*21 in series with the winding $Cd_2$ of the tens relay $D_2$, and in the second circuit through the resistance R*b*21 in series with the winding C*u*1 of the units relay $U_1$. The tens relay $D_2$ of the register becomes operative and the units relay $U_1$ also becomes operative. The subscriber 21 is therefore identified in the register. For the sake of symmetry, the resistances such as R*a*11, R*a*12, . . ., R*a*21, R*a*22, . . . etc., corresponding to the tens relays $D_1$, $D_2$ . . . are made equal to one another and equal to the resistances such as R*b*11, R*b*12, . . . R*b*21, R*b*22 . . . etc., corresponding to the units relays $U_1$, $U_2$, . . . . In addition, these resistances must be large in relation to the resistance of the tens and units relay windings. Thus, the resistance R*a*11 (or the resistance R*b*11) is made large in relation to that of the winding $Cd_1$ (or $Cu_1$). Taking into account the branches, the resistances are such that they permit only the operation of the tens and units relays corresponding to the ringing relay which has just released.

The part A of Figure 3 which is enclosed within a broken line represents a magnetostatic relay comprising the same elements as that of Figure 1. When the subscriber is calling, the winding $e_3$ produces, for example, the operation of the relay A, which releases as soon as the connection between the subscriber's equipment and the register is established by reason of the fact that negative ampere-turns are then given by the winding $e_4$. These negative ampere-turns are maintained as long as the subscriber's handset remains off. The winding $e_2$ is the marking winding, and a normal marking current flows therethrough at the instant when the called subscriber is marked by the register. If the called subscriber is free, the relay A is operated (no negative ampere-turns), but if the called subscriber is engaged, the negative ampere-turns due to the winding $e_4$ prevent the operation of the ringing relay. Under these conditions, the fact that the ringing relay of a called subscriber is operated at a marking of the register indicates that the called subscriber is free.

If there is connected to the point Q of the output collector of the relay a branch consisting of a condenser C, a rectifier R*d* in series with a variable resistance *r* and two control windings $e_a$ and $e_b$ associated respectively with the test relays $T_a$ and $T_b$, any voltage variation at the terminals of the condenser C results in a current pulse, the direction of R*d* being such that the pulse passes when the relay A becomes operative.

Therefore, one of the test relays, either $T_a$ or $T_b$ according to the register which has been busied, is actuated by the pulse and remains operated (storage relay) when the called subscriber is free. The reception of the test pulse at the register indicates to the latter that it can continue the selection of the called subscriber.

In Figure 4, there will be seen the same part A as in Figure 3, which is also a subscriber's ringing relay. A branch comprising a condenser C is connected to the point Q. Connected to the point P is a testing circuit similar to that described with reference to Figure 3. A first discriminating circuit is connected to the point $P_1$, and a second discriminating circuit to the point $P_2$. Each discriminating circuit is similarly composed of a resistance $r_1$ or $r_2$ in series with a rectifier $Rd_1$ or $Rd_2$ and with one or more windings $e_{PB}$ or $e_{PD}$ of relays PB or PD. The rectifiers $Rd_1$, $Rd_2$ of the discriminating circuits are connected in opposite directions to the rectifier R*d* of the testing circuit. The branch at the point P corresponds to the testing of the called subscriber and the pulse is emitted at the instant when the ringing relay pulls up. The branches at the points $P_1$ and $P_2$ are discriminations of subscribers' categories. For example, $P_1$ is the discrimination corresponding to the stations having priority, and $P_2$ the discrimination corresponding to the right of certain subscribers to use the direct connection, the pulse being emitted in both cases at the instant of the release of the ringing relay. The resistances *r*, $r_1$, $r_2$ . . . etc. are peculiar to the ringing realy considered and are present or absent depending upon the discriminations required for the corresponding subscriber. The points F, $F_1$, $F_2$ . . . etc. at which the arrows *f*, $f_1$, $f_2$ . . . are placed are multipling points of like discrimination, that is to say, that part of the discriminating circuit which consists of the rectifier and the relay winding, for example the rectifier $Rd_1$ in series with the winding $e_{PP}$ of the relay PP, is common to all the subscribers having this discrimination, i.e. in this case to all the subscribers whose stations have priority.

As in Figure 3, the winding $e_1$ of the relay A is the working winding, and $e_2$, $e_3$, $e_4$ are control windings of the relay A.

The device illustrated in Figure 4 operates as follows:

It will be assumed that the calling station is a station having priority and has the right to direct connection. At the instant when the ringing relay A falls off, the voltage change at the terminals of the condenser produces a pulse of such direction as to pass through the rectifiers $Rd_1$ and $Rd_2$ but not through the rectifier R*d*. The windings $e_{PP}$ and $e_{PD}$ are energised and the storage relays PP and PD operate, the resistances $r_1$ and $r_2$ being variable resistances. The priority of the calling subscriber's station is therefore translated by the operation of the relay PP and the right to direct connection by the operation of the relay PD. The operated relays PP and PD supply a certain current and are therefore capable of participating in the operation. Obviously, if the branch at the point $P_1$ does not exist for certain stations, no pulse can be sent thereto. The distinction between the priority station and the non-priority station is therefore that the first possesses the circuit branched from the point $P_1$. The significance of the branch is purely conventional. The fact that it does not possess the branch $P_1$ could also signify that the station has priority. The choice is dictated mainly by economic considerations. If, for example, there are a large number of priority stations and only a few normal stations, it is preferably to take the branch $P_1$ for the normal stations and no branch for the priority stations. A similar reasoning could be applied to the point $P_2$ which is the branch point for the right to direct connection.

A particular resistance such as $r_1$, for example, has a value determined by the fact that it must permit the operation of the common relay PP, of which one winding $e_{PP}$ is in series therewith and with the rectifier $Rd_1$.

However, in the case of a pulse emitted by a ringing relay other than that of Figure 4, the point $F_1$ is in this case the common multipling point through which the said pulse arrives. This pulse, which has passed through a resistance $r_1$ associated with its particular relay, is sufficient to operate the relay PP, but it is insufficient to operate the relay PD, because in this case the pulse arriving at $F_1$ must pass in series through the resistances $r_1$ and $r_2$. Its current strength is therefore sufficiently low to prevent actuation of the relay PD.

If the same subscriber also possesses other discriminations, as many possible branches are provided as there are discriminations. These branches are all taken from the common point P, but the forward direction of the rectifier is such that the pulse passes through the branch either at the pulling-up or at the release of the ringing relay, according to the discriminations envisaged.

The described examples relate to p-n-p transistors, but it is also possible to employ n-p-n transistors by reversing the polarities of the current sources and the directions of the rectifiers in an appropriate manner.

We claim:

1. An electrical switching device for the determination of the electrical state of telecommunication lines, each line comprising as a line relay a magnetostatic relay comprising a transistor, said relay having a terminal the potential of which may assume two different values depending upon the operated condition of said relay, each line relay having a condenser with one electrode connected to said terminal, with the other condenser electrode connected through at least one decoupling resistance to at least one multipling point, each multipling point being connected to an operating circuit common to all the lines, each operating circuit comprising in series one rectifier and at least one control winding of an indicator relay controlled by the pulses through a respective condenser caused by variations of the potential of the terminal of a respective line relay.

2. A device according to claim 1, wherein the decoupling resistance in series with a control winding of an indicator relay is high in relation to the resistance of said control winding.

3. A device according to claim 1, wherein the lines of which the state is to be identified are arranged according to a system of decimal coordinates, each coordinate being connected to an operating circuit of which the indicator relay corresponds to one of the tens digit and the units digit of the calling numbers of the lines.

4. A device according to claim 1, wherein the rectifier of the operating circuit for identifying the state of availability of a respective line being called is polarized so that a pulse passes therethrough when the ringing relay becomes operative.

5. A device according to claim 1, wherein each line is connected only to those of the operating circuits corresponding to a discrimination category.

References Cited in the file of this patent

UNITED STATES PATENTS

| | | |
|---|---|---|
| 2,854,517 | Heetman | Sept. 30, 1958 |
| 2,854,519 | Harris | Sept. 30, 1958 |
| 2,857,470 | Faulkner | Oct. 21, 1958 |
| 2,872,524 | Aigrain | Feb. 3, 1959 |